Patented Aug. 14, 1923.

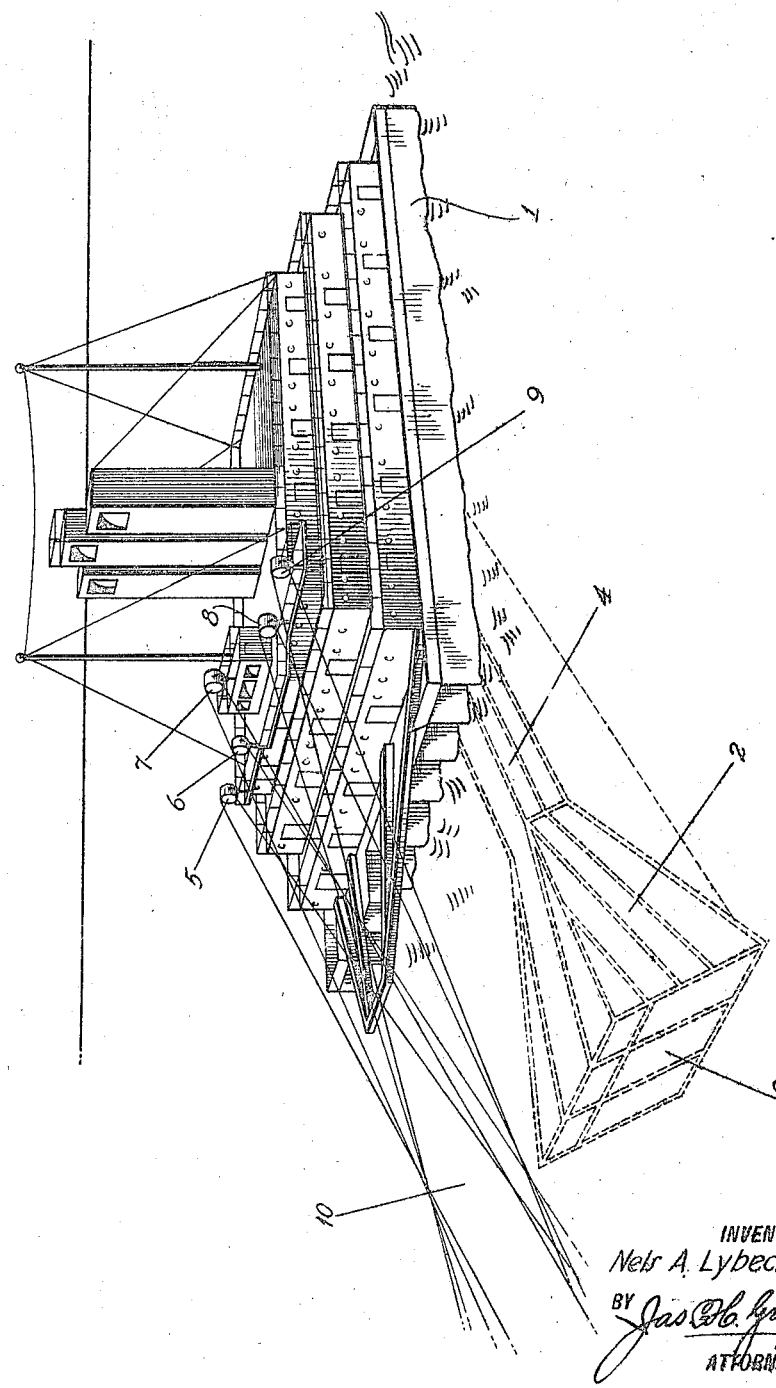

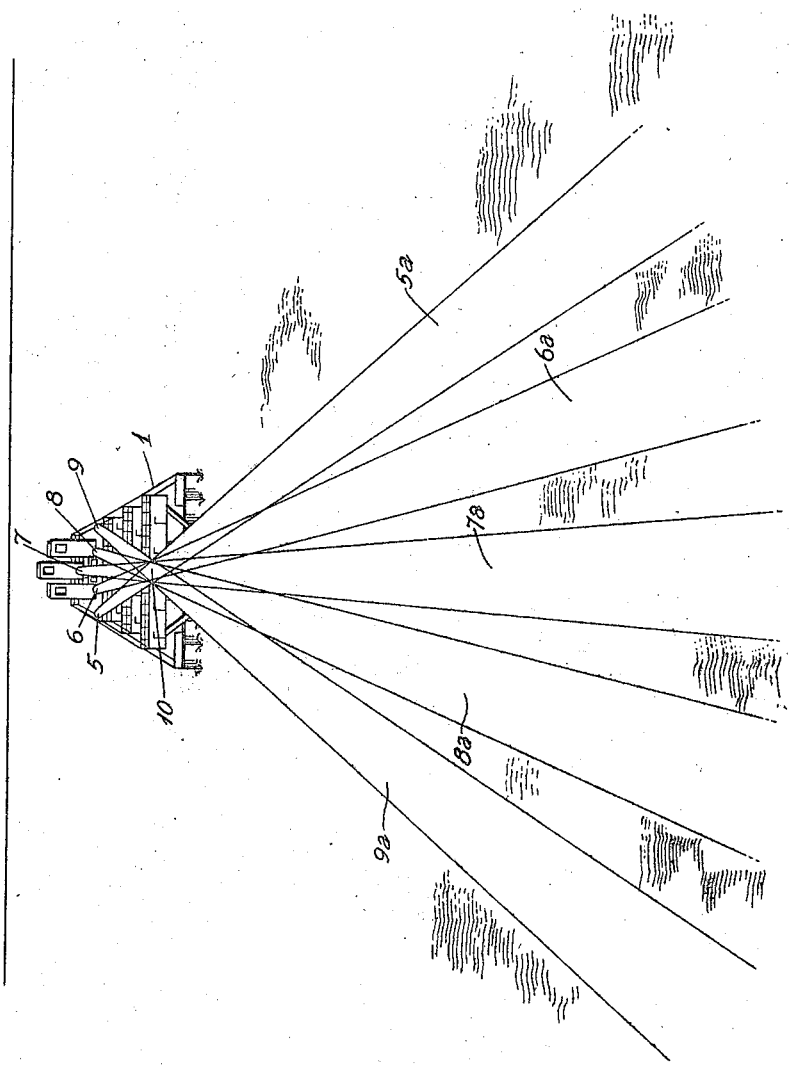

1,464,623

UNITED STATES PATENT OFFICE.

NELS A. LYBECK, OF NEW YORK, N. Y.

METHOD OF FISHING.

Original application filed June 22, 1917, Serial No. 176,274. Divided and this application filed October 28, 1920. Serial No. 420,122.

*To all whom it may concern:*

Be it known that I, NELS A. LYBECK, a citizen of the United States, residing at New York city, borough of Manhattan, in the county and State of New York, have invented a certain new and useful Method of Fishing, of which the following is a specification.

This invention relates to a method of fishing and is more particularly directed to the method of attracting fish into a predetermined zone or locality, whereby they may be more readily caught or collected at night.

Long experience as a fisherman and the study of the habits of fish, have led to the conception of the improved method of this invention, which is carried out by mounting upon a fishing boat, provided at its forward part with a fish collecting scoop, a plurality of powerful searchlights, which are so positioned relative to one another that the powerful rays or beams of light projected from the several lights intersect one another at a point directly forward of the boat and extend in divergent relations beyond such point of intersection for a considerable distance. On a dark night, these beams or rays of light extend with a considerable brilliancy for several miles, illuminating the surface of the water for that distance with a number of cone shaped glows at the apex of which is the boat.

It is well known that fish will come toward a light at night, and when the present invention is practiced, fish within a large area forwardly of the boat will be attracted by the light and through such attraction will enter the diverging zones of illuminated water forwardly of the boat. As the boat moves forward, lighted zones of the water will be brought into convergence and at any particular region will come closer together, thereby drawing the fish into the direct path of the boat. By the time the boat is substantially upon them, they will have been drawn within the dimensions of the open front of the scoop, in which they are collected and disposed of after the manner described in my co-pending application on "fishing boat", filed June 22, 1917, Ser. No. 176,274, or in any other suitable way.

In the preferred manner of practicing the present invention, the search-lights are so positioned that the rays thereof will strike the water forwardly of the scoop so as not to illuminate the scoop but rather leave it in total darkness, so that its approach will not be so clearly discerned by the fish. However, the distance between the forward end of the scoop and the lighted zone is preferably such that the fish will be received within the scoop an instant after the light is carried beyond them, so that they will be immediately surrounded by the scoop and their escape rendered impossible. The fish will naturally scatter when the lighted surface of the water passes beyond them and it is desirable that they be encompassed by the scoop before such scattering can take place.

Features of the invention, other than those specified, will be apparent from the hereinafter detailed description and claims, when read in conjunction with the accompanying drawings.

The accompanying drawings illustrate a fishing boat equipped with search lights by means of which the present invention may be practiced, but it will be understood that the practicing of the present invention is not limited to the apparatus shown in the drawings, but that it can be carried out in other forms of apparatus without departing from the invention.

In the drawings, Figure 1 is a perspective view of a fishing boat equipped for the carrying out of the present invention; and, Figure 2 is a front perspective view of the boat shown in Figure 1.

Referring to the drawings, 1 designates a fishing boat which, for the purpose of illustration, is shown as of the type described and claimed in my co-pending application aforesaid, of which the present case is a division. A boat of this type is provided at its forward end with a scoop 2, which is submerged below the surface of the water and is provided with an open forward end 3 into which fish in the path of the boat are adapted to be received as the boat moves forwardly. The sides of the scoop 2, which are of a foraminous character, extend rearwardly in converging relation and terminate at the forward end of a conveyor housing 4. Within the conveyor housing 4, a conveyor (not shown) operates to lift the fish delivered thereto into the boat. The construction described forms no part of the present invention and further details of such structure are unnecessary here, the description advanced being merely for the purpose of illustrating the manner in which the present invention may be practiced.

In carrying out the present invention, I mount upon the forward portion of the boat, preferably on one of the upper decks, a plurality of powerful searchlights, five of which are shown in the drawings and designated 5, 6, 7, 8 and 9. The searchlight 7 is mounted in the medial line of the boat but directly above the pilot house. The searchlight 5 is mounted on the starboard end of the bridge. The searchlight 9 is mounted on the port end of the bridge and the searchlights 6 and 8 are mounted on the bridge at points intermediate the searchlights 5 and 7 and 7 and 9. Said searchlights are thus positioned at suitable intervals transversely of the boat and in positions to project their beams in a forward direction.

In installing the searchlights in position, they are so arranged that while all of them will cast their beams in a direction forwardly of the boat, they are so adjusted that all of the beams will intersect and cross one another at a point slightly forward of the forward open end 3 of the scoop 2, and, will, beyond this point of intersection, diverge after the manner shown in Figure 2.

From a more specific standpoint, it will be noted in Figure 2, that the light beam 7ª from the searchlight 7, which is positioned in the medial line of the boat, is projected directly forward of the boat, the searchlight 5, which is positioned on the starboard side of the boat projects its beam 5ª across the port quarter; the searchlight 6 intermediate the searchlights 5 and 7 projects its ray 6ª across the port quarter but at a lesser angle than the beam 5ª; the searchlight 9 at the port side of the boat directs its beam 9ª across the starboard quarter; and the searchlight 8 between the lines 7 and 9 also projects its beam across the starboard quarter but at a lesser angle than the beam 9ª. All of the beams 5ª, 6ª, 7ª, 8ª and 9ª intersect across one another at the point 10 directly forward of the open end of the scoop, leaving the open end of the scoop in darkness, but forming forwardly of the point 10 divergent paths of lighted water, as shown in Figure 2.

As the boat moves forwardly, the fish are drawn together within the respective lighted regions ahead and at the same time into the path of the boat, to be gathered into the scoop and transported by the conveyor into the boat.

In the manner described, fish throughout a large area are drawn together by the converging light beams and are herded directly in the path of the scoop, and, in practice, the searchlights may be positioned at different angles to vary the width of effective path of operation. If desired, more or less than five lights may be employed, the number of lights being optional.

Having thus fully described the invention, what I claim as new and desire to secure by Letters Patent is:

1. The method of fishing which consists in moving fish receiving means through the water and attracting fish into the path of the fish receiving means by projecting light onto the surface of the water in advance of the fish receiving means for the purpose of illuminating a divergent area of the water ahead of the fish receiving means and at substantially the apex of which convergent area the fish receiving means moves.

2. The method of fishing which consists in illuminating a divergent area of the surface of the water from above the surface of the water, to attract fish into such area, causing the illuminated divergent area to move forward for the purpose of herding the fish together at the apex of such area and simultaneously moving fish collecting means through the water substantially at the apex of such area for the purpose of collecting the fish.

3. The method of fishing which consists in projecting from above the surface of the water, a plurality of powerful rays of light in converging relation, whereby they intersect at substantially a common point beyond which they are projected in divergent relation and directing such beams of light onto the surface of the water so that they will illuminate the surface of the water, substantially at and beyond the point of intersection of said beams, causing the beams to simultaneously and collectively move forward while maintained in such relation and simultaneously moving forward fish collecting means substantially at the point of intersection of the beams of light, whereby fish are attracted and herded into the path of the fish collecting means and are received thereinto.

4. The method of catching fish which consists in moving submerged fish collecting means through the water and simultaneously projecting a powerful light from above the surface of the water onto the surface thereof to light up a fan shaped area of the surface of the water for a comparatively long distance in advance of the fish collecting means.

In testimony whereof, I have signed my name to this specification.

NELS A. LYBECK.